June 29, 1954

G. J. GARRETT 2,682,264

CRUDE OIL SAMPLE HEATING UNIT

Filed Nov. 30, 1950

Gilbert J. Garrett
INVENTOR.

BY *Clarence A. O'Brien*
*and Harvey B. Jackson*
Attorneys

June 29, 1954 G. J. GARRETT 2,682,264
CRUDE OIL SAMPLE HEATING UNIT
Filed Nov. 30, 1950 3 Sheets-Sheet 2
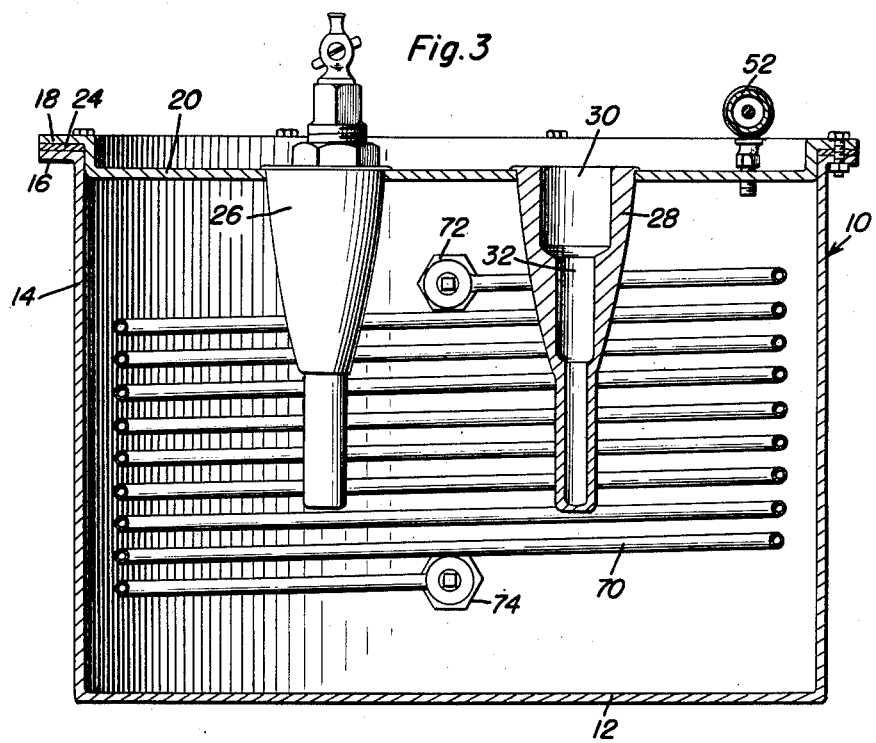
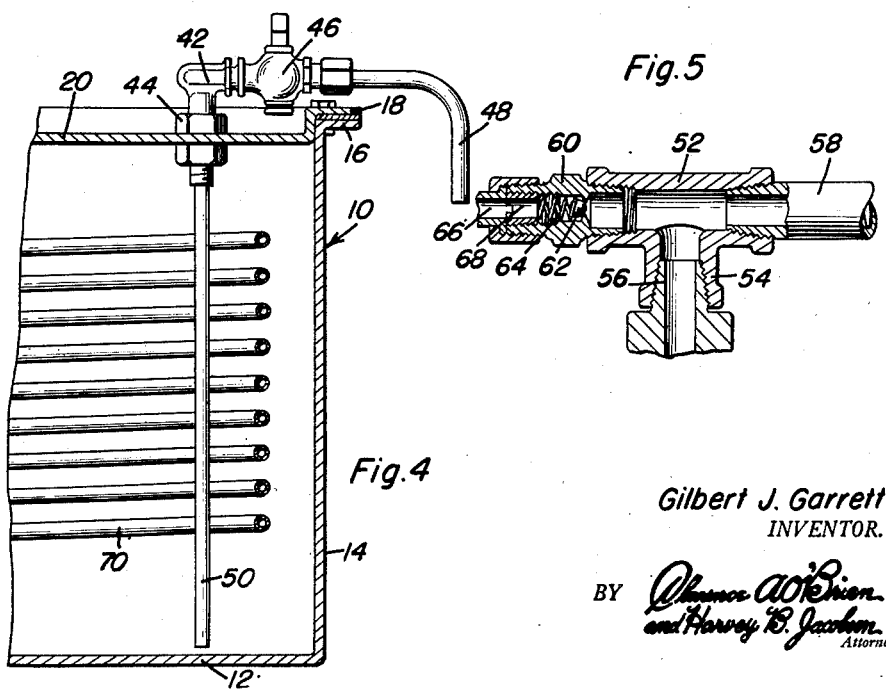
Gilbert J. Garrett
INVENTOR.

June 29, 1954  G. J. GARRETT  2,682,264
CRUDE OIL SAMPLE HEATING UNIT
Filed Nov. 30, 1950  3 Sheets-Sheet 3

Gilbert J. Garrett
INVENTOR.

BY *[signatures]*
Attorneys

Patented June 29, 1954

2,682,264

UNITED STATES PATENT OFFICE 2,682,264

CRUDE OIL SAMPLE HEATING UNIT

Gilbert J. Garrett, Pampa, Tex.

Application November 30, 1950, Serial No. 198,427

2 Claims. (Cl. 126—378)

This invention comprises novel and useful improvements in a crude oil sample heating unit and more specifically pertains to a portable sampling unit for testing the quality of crude oil, which is specifically adapted for use with an automobile vehicle.

The principal object of this invention is to provide a compact, light weight, readily transported sampling unit for heating samples of crude oil for testing the same.

A further object of the invention is to provide a sampling unit in conformity with the preceding object which is specifically adapted for use with an automotive vehicle.

A still further object of the invention is to provide a crude oil sample heating unit as set forth in the foregoing objects in which the source of heat for the same is obtained from the engine cooling system of an automotive vehicle.

Yet another important object of the invention is to provide a crude oil sample heating unit in accordance with the above mentioned objects which is capable of ease of manipulation for applying controllable pressures to the oil samples diluent wherein danger of the creation of excessive pressures is substantially eliminated; and wherein the pressure may be vented or condensate may be withdrawn from the device diluent tank in an improved manner and discharged beneath the floor boards of an automotive vehicle transporting the device.

These, together with various ancillary features and objects of the invention, which will later become apparent as the following description proceeds, are attained by the present invention, a preferred embodiment of which has been illustrated, by way of example only, in the accompanying drawings, wherein:

Figure 3 is a vertical sectional view through the unit of Figure 1;

Figure 4 is a fragmentary vertical sectional view through the unit of Figure 1 showing the condensate venting means of the unit;

Figure 5 is a fragmentary vertical sectional detail view through the combined pressure applying and safety pressure release means of the unit of Figure 1.

Figure 1:
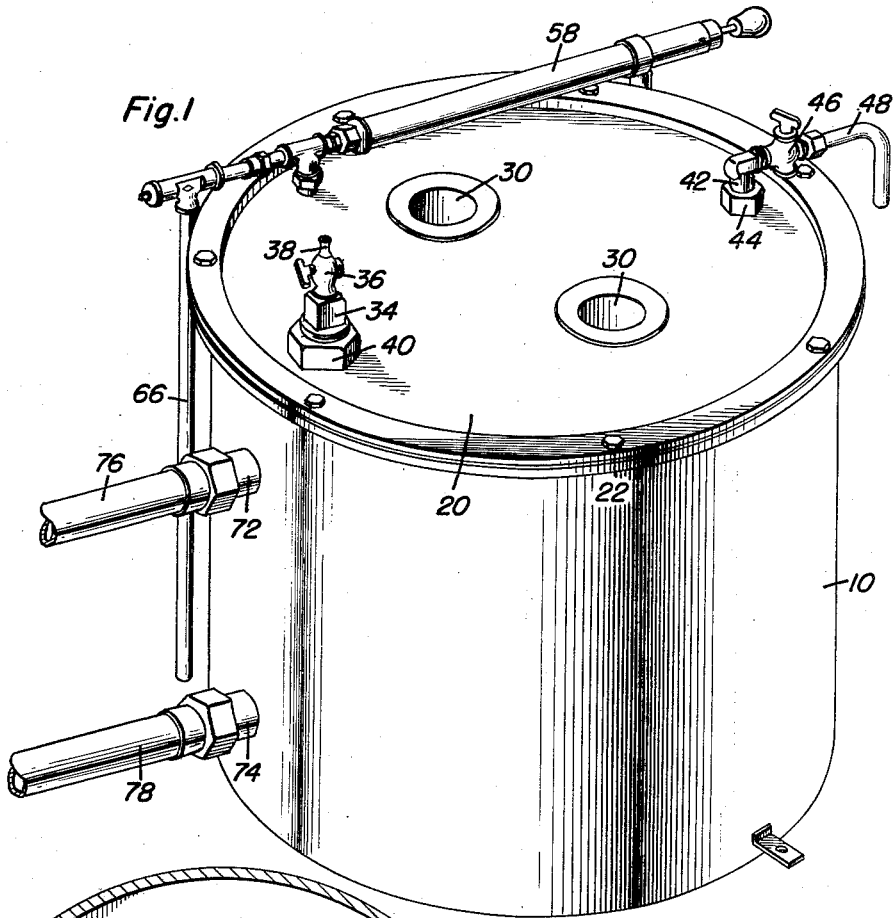
Figure 1 is a perspective view of the sampling unit forming the subject of this invention.
Figure 2:
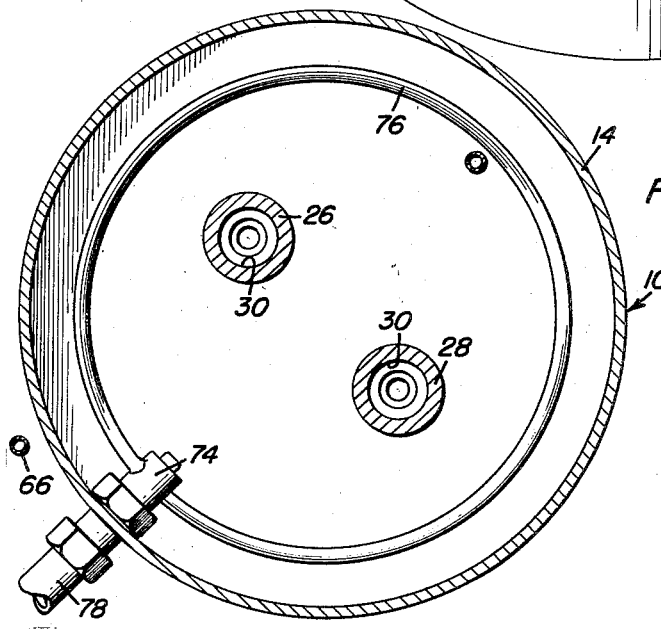
Figure 2 is a horizontal sectional view through the sampling unit shown in Figure 1.

Referring now more specifically to the accompanying drawings, wherein like numerals designate similar parts throughout the various views, attention is directed first primarily to Figures 1–5, wherein it will be seen that the unit includes a container 10 of any desired character, that chosen for the purposes of illustrating the principles of this invention being substantially cylindrical in shape and having a closed bottom wall 12 together with an integral upstanding side wall 14, the latter at its upper end being outwardly flanged as at 16 for the reception of the flange portion 18 of a removable top closure or cover 20.

This removable cover may be secured to the flange 16 as by fastening bolts 22, and a leakproof pressure joint is maintained as by a sealing gasket 24.

Extending through and depending from the closure or cover 20 is a pair of members 26 and 28 of any desired character, and which are provided with sockets 30 having depending bores 32 constituting shouldered recesses to removably receive specimen containing tubes. The members 26 thus constitute receptacles for storing or heating test tubes of glass or of a known character for sampling or gauging the specimens of oil.

Mounted upon the cover or closure 20 and extending through the same is a fitting 34 provided with a petcock or valve 36 and having a discharge nozzle 38. This fitting may be secured to the closure 20 as by a locking nut 40 in any conventional manner. The fitting 34 communicates with the interior of the container 10 immediately below the cover 20, and constitutes a valved or controllable pressure venting means therefor. The fitting 34 is also removable from said nut 40 to facilitate entrance of a diluent into the container 10.

A further fitting 42 is similarly secured to the cover 20 as by a fastening nut 44, this fitting being provided with a petcock 46, and having a diluent and condensate discharge tube 48 extending therefrom. As shown best in Figure 4, the fitting 42 has a depending conduit 50, vertically slidable through the fitting 42 which constitutes a packing gland, and which extends from the cover 20 to adjacent the bottom of the container 10. When the petcock 46 is open and the end of conduit 50 is at the bottom 12, the pressure existing within the container 10 will force condensate from the bottom up through the tube 50 and through the discharge conduit 48. In operation, however, the conduit 50 will have its lower end above the bottom 12 so that the pressure within the tank 10 will force the heated diluent from the tube 48 and into a test tube containing the oil sample to thereby heat the diluted oil sample.

A combined pressure producing and pressure safety release means is mounted upon the cover 20. This means includes a T-coupling 52, having an internally threaded stem portion 54 which is secured to the externally threaded upper end of a nipple 56 secured to and extending through the cover 20. To one arm of the T-coupling 52 is secured a conventional form of pressure producing means such as a manually operated piston type of air pump or compressor 58, see Figure 1, by means of which air under pressure may be forced through the T-coupling into the interior of the container 10 for raising the pressure thereof.

To the other arm of the T-coupling 52 there is connected a pressure release non-return check valve assembly consisting of a tubular casing 60, having a ball check valve 62 urged by a spring 64 against a valve seat. The valve and its seat are so arranged that when subjected to a predetermined pressure in the interior of the container 10, the valve will be forced from its seat against the resistance of the spring 64 and the pressure will be vented through a discharge conduit 66. Obviously, by properly adjusting the tubular bushing 68 which constitutes an abutment for the spring 64, the latter may be adjusted to any desired tension, thus causing the valve to release at any predetermined pressure within the container 10.

A central heating unit is provided for heating the oil sample contained within the casing 10. This heater may conveniently comprise a helical heating coil 70 suitably positioned in the container 10 adjacent the side wall 14 thereof, this heating coil having its terminal portions communicating with fittings 72 and 74 extending through the wall 14 of the container in leak-proof engagement therewith. Flexible conduits 76 and 78 communicate through the fittings 72 and 74 with the coil 70 for circulating any suitable heating fluid therein, whereby the oil diluting medium within the closed and sealed container 10 may be brought to any desired temperature and pressure, for feeding the same, during gauging and testing of the oil sample.

Figure 6:
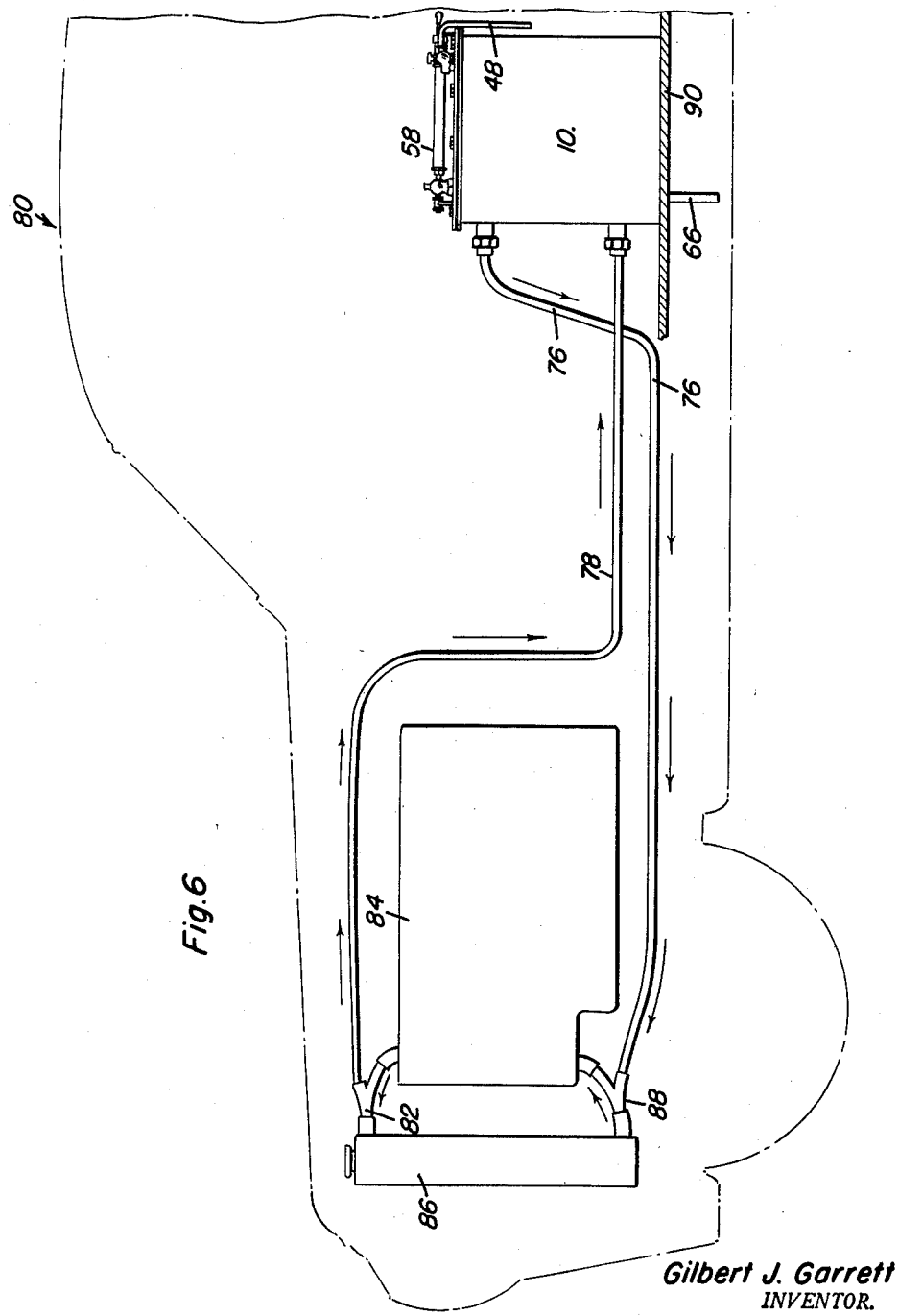
Figure 6 is a somewhat diagrammatic view illustrating the manner in which the unit is operatively connected with and associated with an automotive vehicle and its engine cooling system.

It is a primary purpose of this invention to provide means whereby the sampling unit above described may be advantageously associated with an automotive vehicle for transportation and for operation thereby. For this purpose, as shown in Figure 6, the container 10 is shown as being mounted in any desired manner within an automotive vehicle indicated generally by the numeral 80, as in the rear portion of the vehicle. The flexible conduit 70 constituting the means by which heating fluid is supplied to the heating coil extends from the casing 10 and is connected with a radiator hose 82 which connects the water of an internal combustion engine 84 of the vehicle with the water radiator 86 thereof. The flexible conduit 76, in turn, is connected with the radiator hose 88 and constitutes a means by which the heating fluid is withdrawn from the sample heating unit and returned to the cooling system of the engine.

It will thus be apparent that the heat of the internal combustion engine of the automotive vehicle, as applied to the cooling system thereof, is utilized to supply the necessary heat for the functioning of the crude oil sampling device.

In applying the device to an automotive vehicle, it is intended that the safety pressure valve venting conduit 66 shall be extended below the floor-board 90 of the automotive vehicle.

As is well known, when crude oil specimens are sampled prior to purchase of the flow of an oil well, it is necessary to mix the same with a suitable cleaning and diluting agent such as gasoline, kerosene or the like, and to heat the oil sample in order to melt the paraffin contained in the oil. The present device enables the performance of these necssary operations by means of a very compact apparatus, one which is highly mobile, and which is easy and safe to manipulate.

In the use and operation of the present unit, test tubes containing crude oil samples which are to be tested are inserted in the sockets or wells 30 where they are warmed to a desired degree by the heat which has been transferred to the walls of the wells by the diluent in the container, the diluent having been heated to a desired degree by contact of the hot water heating coils also within the container. The test tubes are removed from the wells and a desired amount of diluent is drawn from the container 10 into the respective test tubes. The desired observations are then made in a conventional manner.

From the foregoing, the construction and operation of the device together with its many advantages will be readily apparent, and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. In a crude oil sample testing unit, a closed container for a crude oil diluent, a hot water heating coil in said container for heating said diluent, the coil being positioned adjacent the side walls of the container, means for relieving excess pressure in said container, means for drawing off portions of said diluent, and means to provide air pressure in said container against said diluent, said container having open wells extending from the top of the container intermediately between the top and bottom walls of the container to receive and warm test tubes and the like containing crude oil samples, said unit according to the foregoing thereby so constructed and arranged that crude oil samples and diluent may be maintained at a desired temperature in proximity for performing crude oil sample test operations in the field.

2. The invention as set forth in claim 1 wherein said means for drawing off portions of the diluent is in the form of an adjustable tube normally extending to a point above the bottom of said container within said diluent but adjustable to a point closely adjacent the bottom wall of said container whereby water in said diluent may be drawn off.

References Cited in the file of this patent

UNITED STATES PATENTS

| Number | Name | Date |
|---|---|---|
| 1,847,178 | Garrett | Mar. 1, 1932 |
| 2,136,040 | Clarke | Nov. 8, 1938 |
| 2,227,938 | Krebs | Jan. 7, 1941 |